US008654445B2

United States Patent
Takagi et al.

(10) Patent No.: US 8,654,445 B2
(45) Date of Patent: Feb. 18, 2014

(54) VIRTUAL IMAGE DISPLAY DEVICE AND LIGHT GUIDE PLATE THEREFOR

(75) Inventors: Masayuki Takagi, Shiojiri (JP); Toshiaki Miyao, Matsumoto (JP); Takahiro Totani, Suwa (JP); Akira Komatsu, Kamiina-gun (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/151,636

(22) Filed: Jun. 2, 2011

(65) Prior Publication Data

US 2011/0310491 A1    Dec. 22, 2011

(30) Foreign Application Priority Data

Jun. 17, 2010   (JP) .................................. 2010-137996

(51) Int. Cl.
  *G02B 27/14*    (2006.01)
  *G02B 27/01*    (2006.01)
(52) U.S. Cl.
  CPC ................................ *G02B 27/0172* (2013.01)
  USPC ....................................................... 359/633
(58) Field of Classification Search
  USPC ......... 359/618, 629–633, 638–640, 650, 857, 359/861, 864, 866; 353/28, 98, 99
  See application file for complete search history.

(56) References Cited

U.S. PATENT DOCUMENTS

| 5,630,784 A | * | 5/1997 | Siegmund et al. ............ 600/160 |
| 6,671,100 B1 | * | 12/2003 | McRuer ......................... 359/630 |
| 6,829,095 B2 | | 12/2004 | Amitai | |
| 2003/0165017 A1 | | 9/2003 | Amitai | |
| 2004/0085649 A1 | * | 5/2004 | Repetto et al. ................ 359/633 |
| 2005/0078374 A1 | * | 4/2005 | Taira et al. ..................... 359/569 |
| 2007/0211227 A1 | * | 9/2007 | Era ................................. 353/99 |
| 2009/0122414 A1 | | 5/2009 | Amitai | |

FOREIGN PATENT DOCUMENTS

| JP | A-2003-536102 | 12/2003 |
| JP | A-2004-157520 | 6/2004 |
| JP | B2-4237571 | 12/2008 |

* cited by examiner

*Primary Examiner* — Scott J Sugarman
*Assistant Examiner* — Robert E Tallman
(74) *Attorney, Agent, or Firm* — Oliff PLC (57) ABSTRACT

The image light entering the image take-out section is reflected by the first reflecting surface and the second reflecting surface in a two-stage manner. It is not only possible to make the light beam with a small total reflection angle out of the image light directly enter the side near to the light entrance section out of each of the reflecting units, but also to make the light beam with a large total reflection angle directly enter the side far from the light entrance section out of each of the reflecting units to thereby make it possible to take out the image light to the outside. Therefore, the image light is emitted as the effective virtual image light for the observer in the condition in which the brightness variation and the picture variation are prevented and a high light efficiency can be obtained.

20 Claims, 6 Drawing Sheets

VIRTUAL IMAGE DISPLAY DEVICE AND LIGHT GUIDE PLATE THEREFOR

BACKGROUND

1. Technical Field

The present invention relates to a light guide plate used for a head-mount display or the like used while worn on the head, and a virtual image display device incorporating the light guide plate.

2. Related Art

In recent years, as a virtual image display device making it possible to form and observe a virtual image such as a head-mount display, there have been proposed various devices of a type of guiding the picture light from the display element to the pupils of the observer using a light guide plate. As such a light guide plate for a virtual image display device, there has been known a light guide plate, which guides the picture light using total reflection, reflects the picture light with a plurality of partial reflecting surfaces disposed in parallel to each other at a predetermined angle with a principal surface of the light guide plate, and thus outputs the picture light to thereby make the picture light reach the retinas of the observer (see JP-T-2003-536102 (Patent Document 1). In such a light guide plate, a part of the picture light passes through the plurality of partial reflecting surfaces a plurality of times, and is taken in the direction toward the eyes. Therefore, the brightness variation and the picture variation are apt to occur in the picture light due to the difference in the number of times of passage through the partial reflecting surfaces, and in order for preventing the variations, devices for relatively adjusting the reflectance and the relative distance between the two or more of the partial reflecting surfaces have been made (Patent Document 1). Further, as a similar technology, there has been known a device of providing a reflecting layer to the sawtooth portion in order for taking out the picture light (see JP-A-2004-157520 (Patent Document 2)).

However, in the case of, for example, Patent Documents 1 and 2 mentioned above, it is required to accurately adjust the reflectance and the relative distance between the partial reflecting surfaces in order for preventing the brightness variation and the picture variation in the image light as the picture light or the like. Further, in the case of Patent Documents 1 and 2, since there is adopted the structure of making the light pass through the members for performing reflection a plurality of times when taking out the image light from the light guide plate by the reflection, the light efficiency cannot help but be relatively low.

SUMMARY

An advantage of same aspects of the invention is to provide a light guide plate for a virtual image display device capable of preventing the brightness variation and the picture variation and emitting the image light in a condition with relatively high light efficiency as virtual light, and a virtual image display device incorporating the light guide plate.

A light guide plate according to an aspect of the invention includes: (a) a light entrance section adapted to take in an image light inside, (b) a light guide section having first and second total reflection surfaces extending so as to be opposed to each other, and adapted to guide the image light taken in from the light entrance section by total reflection on the first and second total reflection surfaces, (c) an image take-out section having a plurality of reflecting units each having a first reflecting surface and a second reflecting surface having a predetermined angle with the first reflecting surface, and arranged in a predetermined direction, and adapted to make it possible to take out the image light to an outside by deflection of a light path performed by the first reflecting surface reflecting the image light entering via the light guide section and the second reflecting surface further reflecting the image light reflected by the first reflecting surface, and (d) a light emission section adapted to emit the image light, which passes through the image take-out section, to the outside. Here, the total reflection includes not only the case in which whole light is reflected on the inside surface and is transmitted, but also the case of reflecting the light by providing the mirror coat on the surface fulfilling the total reflection condition.

In the light guide plate described above, the plurality of reflecting units of the image take-out section each has a structure of reflecting the image light guided by the light guide section with the first reflecting surface and the second reflecting surface of each of the reflecting units in a two-stage manner. Thus, it is not only possible to make the light beam with a small total reflection angle at the light guide section out of the image light directly enter the entrance side near to the light entrance section out of a group of the reflecting units, but also to make the light beam with a large total reflection angle directly enter the back side far from the light entrance section out of the group of the reflecting units to thereby make it possible to take out the image light to the outside. In other words, it becomes possible to take out the whole image light on the side of the observer by deflecting the light path while reducing the number of times of passage through the reflecting units. As a result, the image light respectively entering the reflecting units can be emitted as the effective virtual image light for the observer in the condition in which the brightness variation and the picture variation are prevented and a high light efficiency can be obtained.

According to a specific aspect of the invention, in each of the reflecting units, the first reflecting surface and the second reflecting surface are disposed adjacent to each other. In this case, each of the first reflecting surfaces and each of the second reflecting surfaces adjacent thereto form a pair to surely reflect the image light input thereto toward a specific direction without loss.

According to another aspect of the invention, the plurality of first reflecting surfaces constituting the plurality of reflecting units is arranged with predetermined intervals in parallel to each other. In this case, since the characteristics of the reflecting units can be made uniform, it is possible to prevent the image quality of the image light taken out as the virtual image light from being degraded. It should be noted that regarding the arrangement of the plurality of first reflecting surfaces, the predetermined intervals include not only the case in which the intervals between the first reflecting surfaces are all the same, but also the case in which the intervals have some difference from each other.

According to another aspect of the invention, the image light entering each of the reflecting units passes through the image take-out section once to be deflected in a light path, thereby being emitted from the light emission section as a virtual image light. In this case, it is possible to take out the virtual image light as the effective component for the observer out of the image light in the image take-out section of the image light without causing loss due to the transmission of other reflecting units.

According to another aspect of the invention, the image take-out section is formed along a plane including the first total reflection surface of the light guide section, and the light emission section is disposed on a plane including the second total reflection surface of the light guide section. In this case, it is possible to dispose the image take-out section and the light emission section along the both side surfaces of the light guide section to thereby efficiently take out the image light to the side of the observer.

According to another aspect of the invention, a distance from the first total reflection surface to the second total reflection surface is one of equal to and larger than 1.5 mm. In this case, it is possible to make the field angle of the virtual image light sufficiently large.

According to another aspect of the invention, a light reflectance of the first reflecting surface is higher than a light reflectance of the second reflecting surface. In this case, it is possible to make the reflection efficiency of the image light of the reflecting unit as a whole relatively high while making it possible to observe the external image by assuring the transmission in the second reflecting surface.

According to another aspect of the invention, a light reflectance of the second reflecting surface is one of equal to and higher than 50%. In this case, the light intensity loss in each of the reflecting units can be reduced.

According to another aspect of the invention, the plurality of reflecting units is arranged at a pitch one of equal to and larger than 0.2 mm. In this case, it is possible to prevent the image light to be taken out from being affected by the diffraction in the image take-out section. It should be noted that by setting the pitch to 0.7 mm or smaller, it is possible to prevent the cross stripes due to the reflecting unit from becoming conspicuous for the observer.

According to another aspect of the invention, the first and second reflecting surfaces extend in a direction parallel to the first total reflection surface, and are tilted at respective angles different from each other with the first total reflection surface around respective axes in longitudinal directions extending perpendicularly to the predetermined direction in which the plurality of reflecting units is arranged. In this case, it is possible to surely deflect the image light in the desired angular direction.

According to another aspect of the invention, the first reflecting surface has a tilt angle from 80° to 100° with the first total reflection surface of the light guide section, and the second reflecting surface has a tilt angle from 30° to 40° with the first total reflection surface of the light guide section.

According to another aspect of the invention, at least an outer peripheral section adapted to define an outer shape in the light guide section includes either of a surface coated with a black paint and a sandblasted surface. In this case, it is possible to block the outside light causing the ghost image or reduce the internal reflection by the surface coated with the black paint or the sandblasted surface.

According to another aspect of the invention, the first and second reflecting surfaces extend in a direction parallel to the first total reflection surface, and have a direction, which extends perpendicularly to the predetermined direction in which the plurality of reflecting units is arranged, as a longitudinal direction, and a width of the light guide section with respect to the longitudinal direction is one of equal to and larger than 20 mm. In this case, it can be prevented that a part of the light beam of the image light is reflected in an unexpected direction in the light guide plate to cause the ghost image.

According to another aspect of the invention, the light guide section is made of a refractive index material with a refractive index one of equal to and larger than 1.5. In this case, it becomes easy to guide the image light inside the light guide plate, and the field angle of the image light inside the light guide plate can be made relatively small.

A virtual image display device according to still another aspect of the invention includes: (a) the light guide plate according to any one of the aspects of the invention described above, and (b) an image forming device adapted to form the image light to be guided by the light guide plate. In this case, by using the light guide plate according to any one of the aspects of the invention, the virtual image display device can emit the virtual image light in which the brightness variation and the picture variation are prevented, and in the condition of having high light efficiency.

BRIEF DESCRIPTION OF THE DRAWINGS

The invention will now be described with reference to the accompanying drawings, wherein like numbers reference like elements.

DESCRIPTION OF EXEMPLARY EMBODIMENTS

First Embodiment

Hereinafter, a light guide plate for a virtual image display device and a virtual image display device incorporating the light guide plate according to a first embodiment of the invention will be explained.

A. Structure of Light Guide Plate and Virtual Image Display Device

Figure 1A:
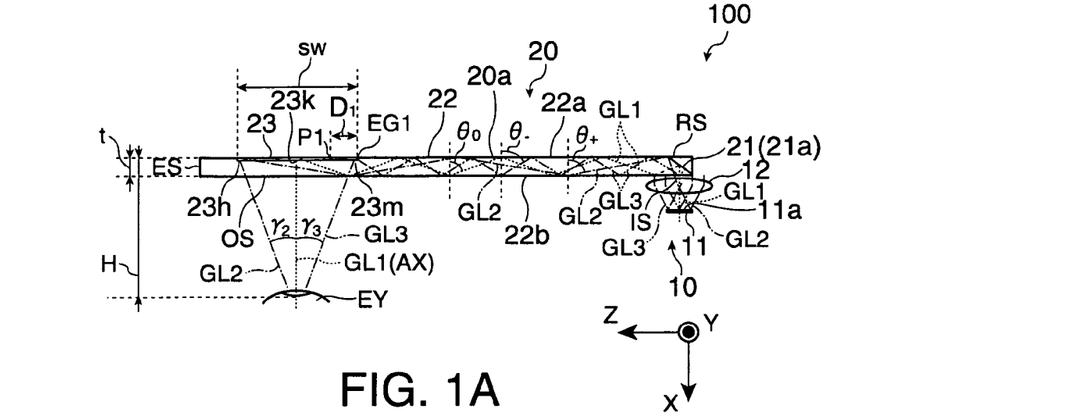
FIG. 1A is a cross-sectional view showing a virtual image display device according to an embodiment of the invention.

The virtual image display device 100 according to the present embodiment shown in FIG. 1A is to be applied to a head-mount display, and is provided with an image forming device 10 and a light guide plate 20 making a set. It should be noted that FIG. 1A corresponds to the A-A cross section of the light guide plate 20 shown in FIG. 1B.

The virtual image display device 100 is for making the observer recognize the image light of the virtual image, and at the same time, making the observer observe the external image in a see-through manner. Although the image forming device 10 and the light guide plate 20 are normally provided as a set to each of the right and left eyes of the observer, the set for the right eye and the set for the left eye are bilaterally symmetrical to each other, and therefore, only the set for the right eye is shown here, and the set for the left eye is omitted from the drawings. It should be noted that the virtual image display device 100 is arranged to have an appearance (not shown) similar to, for example, typical spectacles as a whole.

The image forming device 10 is provided with a liquid crystal device 11 as an image display element, and a collimating lens 12 for forming a light beam. The liquid crystal device 11 spatially modulates the illumination light from a light source (not shown) to thereby form the image light to be the display object such as a moving image. The collimating lens 12 changes the image light emitted from each point on the liquid crystal device 11 to the light beam in a collimated state. It should be noted that either of glass and plastics can be adopted as the lens material of the collimating lens 12.

Figure 1B:
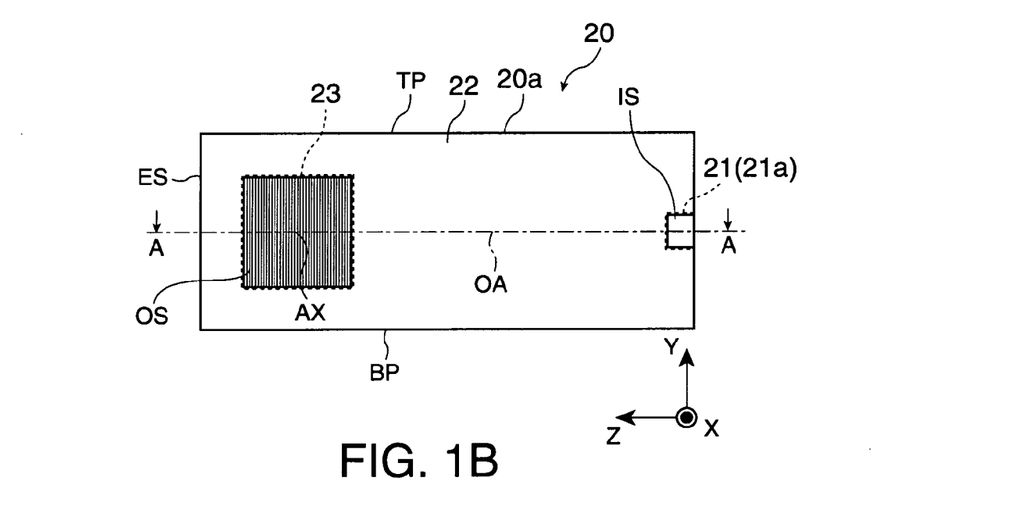
FIGS. 1B and 1C are respectively a front view and a plan view of a light guide plate according to the embodiment.
Figure 1C:
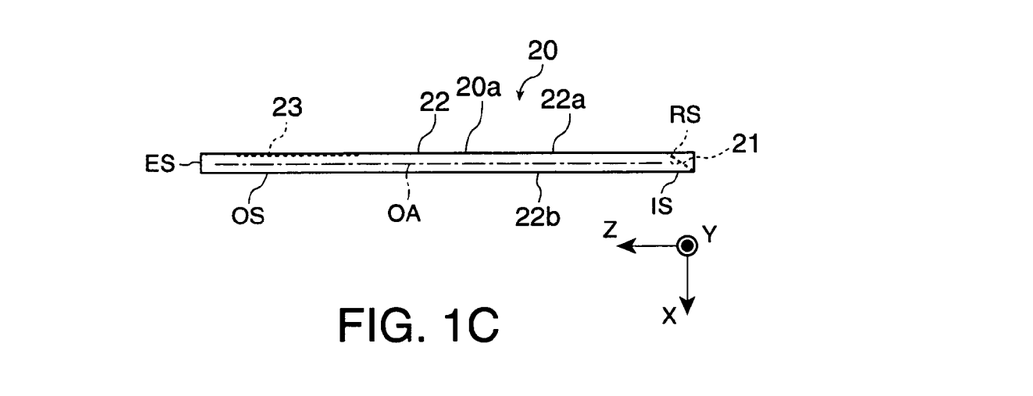

As shown in FIGS. 1A through 1C, the light guide plate 20 according to the present embodiment is provided with a light guide plate main body 20a, an incident light deflection section 21, and an image take-out section 23. The light guide plate 20 is for emitting the image light formed by the image forming device 10 toward the eyes EY of the observer as the virtual image light to thereby make the observer recognize it as an image.

The overall appearance of the light guide plate 20 is formed by the light guide plate main body 20a, which is a flat plate extending in parallel to the Y-Z plane in the drawings. Further, the light guide plate 20 has a structure having the image take-out section 23, which is composed of a number of minute mirrors embedded in the light guide plate main body 20a, at one of the longitudinal ends thereof, and the incident light deflection section 21, which is formed by cutting a part of the light guide plate main body 20a, on the other of the longitudinal ends thereof.

The light guide plate main body 20a is made of a light transmissive resin material or the like, and has a light entrance surface IS as a light entrance section for taking in the image light from the image forming device 10 and a light emission surface OS as a light emission section for emitting the image light toward the eyes EY of the observer on the obverse side plane thereof parallel to the Y-Z plane and opposed to the image forming device 10. The light guide plate main body 20a has a rectangular tilted surface RS formed by cutting a part of the parallel plate shape on the reverse side of the light entrance surface IS, and on the tilted surface RS, there is formed a mirror layer 21a so as to cover the tilted surface RS. Here, the mirror layer 21a cooperates with the tilted surface RS to thereby function as the incident light deflection section 21 tilted with respect to the light entrance surface IS. Further, in the light guide plate main body 20a, there is formed the image take-out section 23 as a minute structure along the plane on the reverse side of the light emission surface OS.

The incident light deflection section 21 disposed so as to face the light entrance surface IS of the light guide plate main body 20a is formed by performing deposition such as aluminum vapor deposition on the tilted surface RS of the light guide plate main body 20a, and functions as a reflecting surface for reflecting the incident light to deflect the light path thereof in a predetermined direction approximate to an orthogonal direction. Therefore, the incident light deflection section 21 deflects the image light, which enters the light entrance surface IS and proceeds in the −X direction as a whole, so as to proceed in the +Z direction as a whole to thereby surely combine the image light in the light guide plate main body 20a.

Further, the light guide plate main body 20a has a light guide section 22, which guides the image light input inside via the incident light deflection section 21 to the image take-out section 23, through the area from the incident light deflection section 21 on the entrance side to the image light take-out section 23 on the back side.

The light guide section 22 has a first total reflection surface 22a and a second total reflection surface 22b each for totally reflecting the image light deflected by the incident light deflection section 21 as a pair of planes, which are the principal surfaces of the plate-like light guide plate main body 20a opposed to each other and extend in parallel to the Y-Z plane. It is assumed here that the first total reflection surface 22a is located on the reverse side far from the image forming device 10, and the second total reflection surface 22b is located on the obverse side near to the image forming device 10. In this case, the second total reflection surface 22b forms a surface part common to the light entrance surface IS and the light emission surface OS. The image light reflected on the incident light deflection section 21 firstly enters the second total reflection surface 22b and is then totally reflected. Subsequently, the image light enters the first total reflection surface 22a, and is then totally reflected. By subsequently repeating the actions described above, the image light is guided to the back side of the light guide plate 20, namely the +Z side where the image take-out section 23 is disposed.

The image take-out section 23 disposed so as to face the light emission surface OS of the light guide plate main body 20a is formed along an extended plane of the first total reflection surface 22a and close to the extended plane in the back side (the +Z side) of the light guide section 22. The image take-out section 23 reflects the image light, which is input thereto via the first and second total reflection surfaces 22a, 22b of the light guide section 22, at a predetermined angle to thereby deflect it toward the light emission surface OS. It is assumed here that the image light entering first the image take-out section 23 is the take-out object as the virtual image light. Details of the structure of the image take-out section 23 will be described later with reference to FIG. 2A and so on.

It should be noted that the light guide plate main body 20a has a termination surface ES as a side surface for forming the end surface on the +Z side out of the outer shape of the light guide plate 20. Further, the light guide plate main body 20a has an upper end surface TP and a lower end surface BP respectively as upper and bottom surfaces forming the end surfaces on the ±Y sides.

Further, it is assumed that the transparent resin material used for the light guide plate main body 20a is a high-refractive index material having a refractive index n equal to or higher than 1.5. By using the transparent resin material having a relatively high refractive index for the light guide plate 20, it becomes easy for the light guide plate 20 to guide the image light inside the light guide plate 20, and it becomes possible to set the field angle of the image light inside the light guide plate 20 to be relatively small.

Since the light guide plate 20 has the structure described above, the image light emitted from the image forming device 10 and then entering the light guide plate 20 from the light entrance surface IS is evenly reflected by the incident light deflection section 21 to be deflected, then proceeds substantially along the optical axis OA in a condition of having certain spread while being totally reflected in the first and second total reflection surfaces 22a, 22b of the light guide section 22 in a repeated manner, and is then further deflected in the image take-out section 23 at an appropriate angle to thereby be in the condition in which the image light can be taken out, and is then finally emitted from the light emission surface OS. The image light emitted from the light emission surface OS enters the eyes BY of the observer as the virtual image light. By the virtual image light forming an image on the retinas of the observer, the observer can recognize the image light such as the picture light due to the virtual image.

B. Light Path of Image Light

The light path of the image light will hereinafter be explained in detail. As shown in FIG. 1A, it is assumed that the component emitted from the center portion of the emission surface 11a illustrated with the dotted line in the drawing out of the image light respectively output from the emission surface 11a of the liquid crystal device 11 is image light GL1, the component emitted from the right side (the −Z side) of the sheet out of the periphery of the emission surface 11a illustrated with the dashed-dotted line in the drawing is image light GL2, and the component emitted from the left side (the +Z side) of the sheet out of the periphery of the emission surface 11a illustrated with the dashed-two dotted line in the drawing is image light GL3.

The principal components of the respective image light GL1, GL2, and GL3 passing through the collimating lens 12 enter the light entrance surface IS of the light guide plate 20, and then repeat the total reflection on the first and second total reflection surfaces 22a, 22b at respective angles different from each other. Specifically, the image light GL1 emitted from the center portion of the emission surface 11a out of the image light GL1, GL2, and GL3 is reflected at the incident light deflection section 21 as a parallel light beam, then enters the second total reflection surface 22b of the light guide section 22 at a standard reflection angle $\theta_0$, and is then totally reflected. Subsequently, the image light GL1 repeats the total reflection on the first and second total reflection surfaces 22a, 22b in a condition of keeping the standard reflection angle $\theta_0$. The image light GL1 is totally reflected by the first and second total reflection surfaces 22a, 22b N times (N denotes a natural number), and then enters the center portion 23k of the image take-out section 23. The image light GL1 is reflected at the center portion 23k at a predetermined angle, and is then emitted from the light emission surface OS in the direction of the optical axis AX perpendicular to the Y-Z plane including the light emission surface OS as a parallel light beam. The image light GL2 emitted from one end (the −Z side) of the emission surface 11a is reflected by the incident light deflection section 21 as a parallel light beam, and then enters the second total reflection surface 22b of the light guide section 22 at the maximum reflection angle $\theta_+$, and is then totally reflected. The image light GL2 is totally reflected on the first and second total reflection surfaces 22a, 22b N−M times (M denotes a natural number), then reflected in the peripheral portion 23h on the back side (the +Z side) of the image take-out section 23 at a predetermined angle, and is then emitted from the light emission surface OS toward the predetermined angle direction as a parallel light beam. The emission angle on this occasion is arranged so that the light is returned toward the incident light deflection section 21, and is an obtuse angle with the +Z axis. The image light GL3 emitted from the other end (the +Z side) of the emission surface 11a is reflected by the incident light deflection section 21 as a parallel light beam, and then enters the second total reflection surface 22b of the light guide section 22 at the minimum reflection angle $\theta_-$, and is then totally reflected. The image light GL3 is totally reflected on the first and second total reflection surfaces 22a, 22b N+M times, then reflected in the peripheral portion 23m on the entrance side (the −Z side) of the image take-out section 23 at a predetermined angle, and is then emitted from the light emission surface OS toward the predetermined angle direction as a parallel light beam. The emission angle on this occasion is arranged so that the light gets away from the incident light deflection section 21, and is an acute angle with the +Z axis. It should be noted that since the reflection efficiency of the light by the total reflection on the first and second total reflection surfaces 22a, 22b is extremely high, if the number of times of reflection is different between the image light GL1, GL2, and GL3 as described above, the brightness variation is hardly caused by the variation, and there is no chance to feel the influence of the image variation on the visual recognition. Further, although the image light GL1, GL1, and GL3 are explained as the representatives of the parts of the entire light beam of the image light, since other light beam components constituting the image light are guided similarly to the image light GL1 and so on and are emitted from the light emission surface OS, such light beam components are omitted from the illustration and the explanation. It should be noted that some refraction action is acted on the image light GL2, GL3 when passing through the light emission surface OS.

Here, if n=1.5 is assumed as the value of the refractive index n of the transparent resin material used for the incident light deflection section 21 and the light guide section 22, the value of the critical angle $\theta_c$ is obtained as $\theta_c \approx 41.8°$, and if n=1.6 is assumed, the value of the critical angle $\theta_c$ is obtained as $\theta_c \approx 38.7°$. By setting the reflection angle $\theta_-$, which is the smallest one of the reflection angles $\theta_0$, $\theta_+$, and $\theta_-$ of the respective image light GL1, GL2, and GL3 to the value larger than the critical angle $\theta_c$, it is possible to fulfill the total reflection condition inside the light guide section 22 with respect to the necessary image light.

C. Structure of Image Take-Out Section and Deflection of Light Path by Image Take-Out Section The structure of the image take-out section 23 and the deflection of the light path of the image light by the image take-out section 23 will hereinafter be explained in detail with reference to FIG. 2A and so on.

Figure 2A:
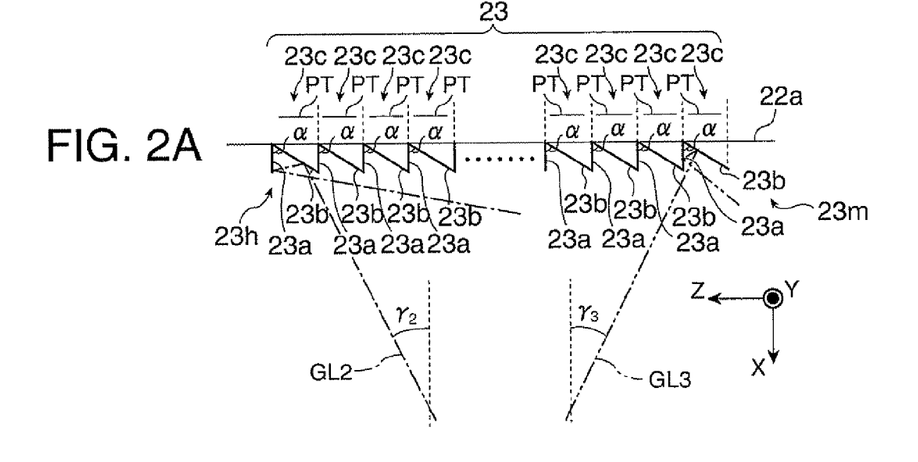
FIGS. 2A through 2C are schematic diagrams for explaining a structure of an image take-out section and a light path of the image light in the image take-out section.
Figure 2B:
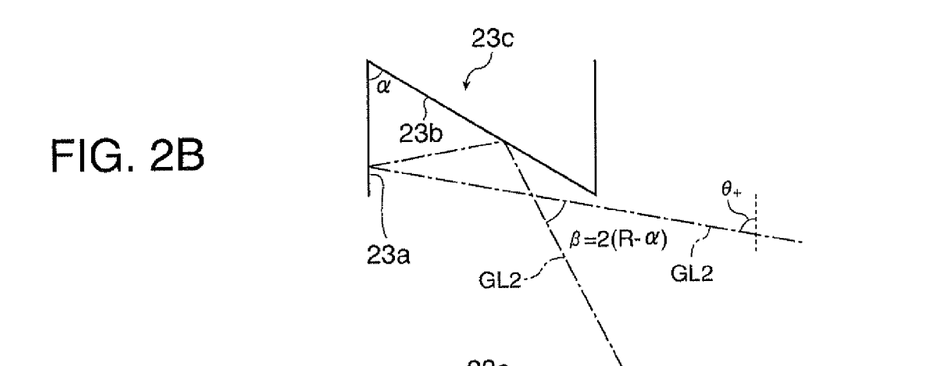
Figure 2C:
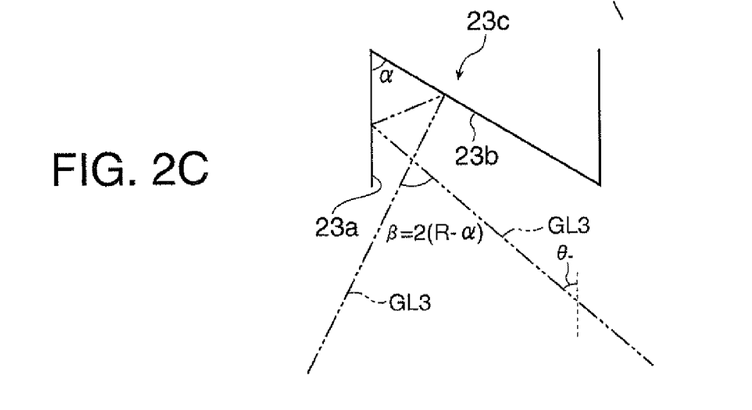

Firstly, the structure of the image take-out section 23 will be explained. The image take-out section 23 is composed of a number of linear reflecting units 23c arranged in a stripe manner. In other words, as shown in FIGS. 2A through 2C, the image take-out section 23 is configured by arranging a number of elongated reflecting units 23c extending in the Y direction at a predetermined pitch PT in a direction in which the light guide section extends, namely the Z direction. Each of the reflecting units 23c has a first reflecting surface 23a disposed on the back side, namely the downstream side of the light path, and a second reflecting surface 23b disposed on the entrance side, namely the upstream side of the light path. Further, each of the reflecting units 23c has a V shape or a wedge shape in the X-Z cross-sectional view with the first and second reflecting surfaces 23a, 23b adjacent to each other. More specifically, the first and second reflecting surfaces 23a, 23b extend linearly taking the direction parallel to the first total reflection surface 22a shown in FIG. 1A and so on, and extending perpendicularly to the Z direction in which the reflecting units 23c are arranged, namely the Y direction as the longitudinal direction. Further, the first and second reflecting surfaces 23a, 23b are tilted around the longitudinal direction at respective angles with the first total reflection surface 22a different from each other (i.e., respective angles with the Y-Z plane difference from each other). As a result, the first reflecting surfaces 23a are arranged periodically in a repeated manner, and extend in parallel to each other, and the second reflecting surfaces 23b are also arranged periodically in a repeated manner, and extend in parallel to each other. In the specific example shown in FIG. 2A and so on, each of the first reflecting surfaces 23a is assumed to extend along a direction (the X direction) roughly perpendicular to the first total reflection surface 22a. Further, each of the second reflecting surfaces 23b extends in a direction at a predetermined angle (the relative angle) α with the corresponding first reflecting surface 23a. Here, the relative angle α is assumed to be set to, for example, 54.7° in the specific example.

Although it is assumed in the specific example shown in FIG. 2A and so on that the first reflecting surface 23a is roughly perpendicular to the first total reflection surface 22a, the direction of the first reflecting surface 23a is arbitrarily adjusted in accordance with the specification of the light guide plate 20, and can be arranged to have any tilt angle within a range from 80° to 100°, for example, clockwise with respect to the first total reflection surface 22a taking the −Z direction as a reference. Further, the direction of the second reflecting surface 23b is arbitrarily adjusted in accordance with the specification of the light guide plate 20 taking the tilt condition of the first total reflection surface 22a as a reference, and can be arranged to have any tilt angle within the range from 30° to 40°, for example, clockwise with respect to the first total reflection surface 22a taking the −Z direction as a reference. As a result, the second reflecting surface 23b has a relative angle in a range from 40° to 70° with respect to the first total reflection surface 22a.

The deflection of the light path of the image light by the image take-out section 23 will hereinafter be explained in detail. Here, the image light GL2 and the image light GL3 entering the both ends of the image take-out section 23 out of the image light will be described, while other light paths, which are substantially the same as these image light paths, will be omitted from the illustration.

Firstly, as shown in FIGS. 2A and 2B, the image light GL2 guided with the reflection angle $\theta_+$ having the largest total reflection angle out of the image light enters one of the reflecting units 23c disposed in the peripheral part 23h on the +Z side the furthest from the light entrance surface IS (see FIG. 1A) of the image take-out section 23. As shown in FIG. 2B, in the reflecting unit 23c, the image light GL2 is firstly reflected on the first reflecting surface 23a on the back side, namely the +Z side, and is then reflected on the second reflecting surface 23b on the entrance side, namely the −Z side. The image light GL2 passing through the reflecting unit 23c is emitted from the light emission surface OS shown in FIG. 1A and so on without passing through any other reflecting unit 23c. In other words, the image light GL2 is deflected to have a desired angle with only a single passage in the image take-out section 23, and is then taken out to the side of the observer.

Further, as shown in FIG. 2A and FIG. 2C, which is the enlarged view of FIG. 2A, the image light GL3 guided with the reflection angle $\theta_-$ having the smallest total reflection angle enters one of the reflecting units 23c disposed in the peripheral part 23m on the −Z side the nearest to the light entrance surface IS (see FIG. 1A) of the image take-out section 23. As shown in FIG. 2C, in the reflecting unit 23c, the image light GL3 is firstly reflected on the first reflecting surface 23a on the back side, namely the +Z side, and is then reflected on the second reflecting surface 23b on the entrance side, namely the −Z side similarly to the case of the image light GL2 shown in FIG. 2B. The image light GL3 passing through the reflecting unit 23c is deflected to have a desired angle with only a single passage in the image take-out section 23, and is then taken out to the side of the observer without passing through any other reflecting unit 23c.

Here, in the case of the two-stage reflection in the first and second reflecting surfaces 23a, 23b described above, the deflection angle β as the angle between the direction in which each image light is input and the direction in which each image light is output is obtained as β=2(R−α) (R denotes the right angle) in either case as shown in FIGS. 2B and 2C. In other words, the deflection angle β is constant irrespective of the value of the incident angle with respect to the image take-out section 23, namely the reflection angles $\theta_0$, $\theta_+$, $\theta_-$, and so on as the total reflection angles of the respective image light. Thus, as described above, even in the case in which the component with a relatively large total reflection angle out of the image light is made to enter the peripheral part 23h side on the +Z side out of the image take-out section 23, and the component with a relatively small total reflection angle is made to enter the peripheral part 23m side on the −Z side out of the image take-out section 23, it becomes possible to efficiently take out the image light in the angle condition in which the image light is collected to the eyes EY of the observer as a whole. Since the configuration of taking out the image light with such an angular relationship is adopted, the light guide plate 20 can make the image light pass through the image take-out section 23 only once instead of two or more times, thus making it possible to take out the image light as the virtual image light with slight loss.

It should be noted that by arbitrarily adjusting the angles or the like with which the image light GL2, GL3 and so on are guided in the optical design of the shape and the refractive index of the light guide section 22, the shape of the reflecting unit 23c constituting the image take out section 23, and so on, it is possible to make the image light, which is emitted from the light emission surface OS, enter the eyes EY of the observer as the virtual image light in the condition of keeping the symmetrical property as a whole taking the basic image light GL1, namely the optical axis AX, as the point of symmetry. In other words, the angle $\gamma_2$ of the image light GL2 on one end with respect to the X direction or the optical axis AX and the angle $\gamma_3$ of the image light GL3 on the other end with respect to the X direction or the optical axis AX are roughly the same in amount and opposite to each other in direction. It should be noted that the angles $\gamma_2$, $\gamma_3$ of the respective image light GL2, GL3 are arranged to be relatively approximate to the perpendicular with respect to the light emission surface OS or the second total reflection surface 22b, and therefore, the image light GL2, GL3 pass through the light emission surface OS with a sufficient transmittance. Further, the angle $\gamma_2$ and the angle $\gamma_3$ correspond to the field angles of the image light emitted from the image forming device 10. In the case in which the angle $\gamma_2$ and the angle $\gamma_3$ with respect to the optical axis AX are equal to each other, the following relationship is obtained assuming that the distance from the eyes EY of the observer to the image take-out section 23 is a distance H, and the length of the image take-out section 23 in the Z direction is a width SW.

$$SW = 2H \cdot \tan \gamma_2 = 2H \cdot \tan \gamma_3$$

Here, the light reflectance of the first reflecting surface 23a is arranged to be higher than the light reflectance of the second reflecting surface 23b. More specifically, it is assumed that the light reflectance of the second reflecting surface 23b is no lower than 50%, and the light reflectance of the first reflecting surface 23a is approximately 100%. According to this configuration, a relatively high reflection efficiency of the image light on the first and second reflecting surfaces 23a, 23b can be obtained. As described above, the virtual image display device 100 is a see-through type for making the observer observe the external image, and in this case, the light reflectance of each of the reflecting surfaces generally has an upper limit due to the requirement of ensuring the observation of the external image. In other words, although in the case described above it is assumed that the light reflectance of the second reflecting surface 23b is no lower than 50%, the light reflectance is provided with the upper limit on the specification such as 70%, for example. In contrast, the first reflecting surface 23a does not affect the observation of the external image in the case in which it is perpendicular to or substantially perpendicular to the first total reflection surface 22a as shown in FIG. 2A and so on. Therefore, the light reflectance can be set to approximately 100%. Therefore, in this case, by increasing the light reflectance in the first reflecting surface 23a to approximately 100%, the high reflection efficiency as the overall reflecting unit 23c including the first and second reflecting surfaces 23a, 23b can be obtained while making it possible to observe the external image by assuring the transmission in the second reflecting surface 23b.

Further, as already explained, the first reflecting surfaces 23a or the second reflecting surfaces 23b constituting the group of reflecting units 23c are arranged at a constant pitch in parallel to each other. Thus, it is possible to make the image light, which is the virtual image light entering the eyes EY of the observer, uniform, and it is possible to prevent the degradation of the quality of the image to be observed.

D. Specific Configuration of Light Guide Plate

Hereinafter, the conditions and so on for specifically configuring the virtual image display device 100 using the light guide plate 20 described above will be explained using FIG. 1A.

Firstly, the condition for preventing the image light from passing through the image take-out section 23 two or more times will be explained. For that purpose, various values related to the image light and so on will be defined as follows. Firstly, in FIG. 1A, the position of the peripheral part 23m located at the most entrance side (the −Z side) out of the image take-out section 23 is defined as a position EG1. Further, the total reflection angle of the image light entering a position P1 shifted a distance $D_1$, which is determined arbitrarily, from the position EG1 in the +Z direction on the image take-out section 23 is defined as an angle $\theta_{D1}$. In this case, in order for preventing the image light from passing through the image take-out section 23 two or more times, it is required for these values and the thickness t of the light guide plate 20 to fulfill the following relationship.

$$2 \cdot t \cdot \tan \theta_{D1} > D_1 \quad (1)$$

The left side of the above inequality represents the distance the image light proceeds in the Z direction while making a reciprocal movement in the X direction. If the value is larger than the distance $D_1$ of the right side, it means that the previous total reflection position on the first total reflection surface 22a of the image light entering the position P1, namely the total reflection position two times before the image light enters the position P1, is located on the entrance side (the −Z side) of the image take-out section 23. In other words, in this case, regarding the present image light, the position P1 is the first entrance position, and thus, the configuration of preventing the image light from passing through the image take-out section 23 two or more times is obtained. Therefore, if the entire image light entering the surface of the image take-out section 23 fulfills the condition of the formula (1) above, the configuration of preventing the image light from passing through the image take-out section 23 two or more times can be obtained. For example, in the case in which the image light proceeds along the light path shown in FIG. 1A, if the image light GL2, which is the light entering the peripheral part 23h located on the side the furthest from the light entrance surface IS out of the positions on the image take-out section 23, namely the +Z side, out of the image light, fulfills the relationship of the inequality (1) described above, it results that the remaining image light also fulfills the condition. In other words, regarding the image light GL2 propagating the light guide plate 20 at the maximum reflection angle $\theta_+$, it is sufficient that the following relationship is fulfilled with respect to the width SW of the image take-out section 23 in the Z direction and the thickness t of the light guide plate 20.

$$2 \cdot t \cdot \tan \theta_+ > SW \quad (1)'$$

Figure 3:
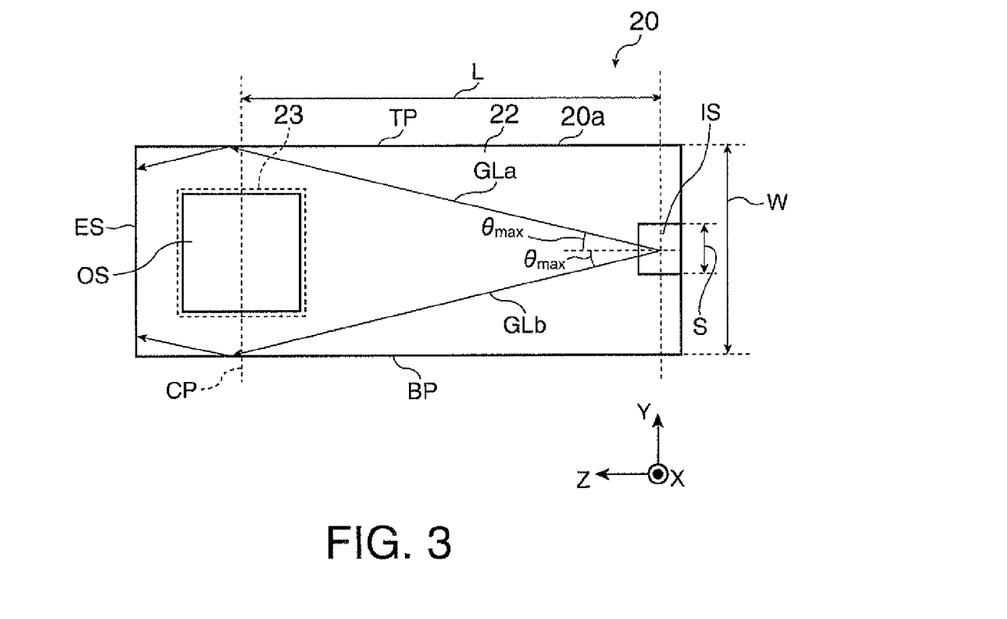
FIG. 3 is a diagram for explaining suppression of ghost images due to the light from a light entrance section.

As shown in FIG. 3, from another viewpoint regarding the configuration of the light guide plate 20, the vertical width W, which is the width of the light guide section 22 in the longitudinal direction of the reflecting unit 23c, namely the Y direction, is equal to or larger than 20 mm. Thus, it is possible to prevent a part of the light beam of the image light entering the light entrance surface IS from being reflected on the upper end surface TP and the lower end surface BP of the light guide plate 20 in unexpected directions to cause ghost images. In the specific explanation, firstly regarding the Z direction in FIG. 3, the distance from the light entrance surface IS to the center position CP of the image take-out section 23 in the light guide plate is defined as a light guide plate effective length L. Further, regarding the Y direction in FIG. 3, the vertical dimension, namely the dimension along the Y direction, of the light entering the light entrance surface IS is defined as a light source vertical width S. Further, in the light guide plate 20, regarding the Y direction, the largest light beam angle is defined as a maximum light beam angle θmax. In this case, even if the component proceeding toward the upper end surface TP and the lower end surface BP at the maximum light beam angle θmax out of the light beam emitted from the light entrance surface IS is deflected by reflection (or total reflection) in the interval of the light guide plate effective length L, and becomes the light having the component in the upside-down direction with respect to the original light, it is sufficient that the light is not taken in the image take-out section 23 in order for preventing the ghost image from occurring. For this purpose, it is sufficient that the vertical width W has been large enough, and specifically, it is sufficient to fulfill the following condition.

$$W \geq 2 \cdot L \cdot \tan(\theta \max) + S/2 \quad (2)$$

In other words, by fulfilling the above inequality (2), it is possible to prevent the light reflected (or totally reflected) on the upper end surface TP or the lower end surface BP of the light guide plate 20 from being taken in the image take-out section 23 as the image light. It should be noted that in the inequality (2) described above, the margin corresponding to the width of the light source vertical width S is taken into consideration in addition to the deflection on the upper end surface TP or the lower end surface BP. Here, as general values, the light guide plate effective length L is set to 40 mm, and the light source vertical width S is set to 20 mm, for example. Further, the maximum light beam angle θmax is determined in accordance with the characteristics of the light source such as the liquid crystal device 11 shown in FIG. 1A, and a general value is arbitrarily considered. According to the above, by setting the vertical width W of the light guide plate 20 to be equal to or larger than 20 mm, even if the image light GLa, GLb emitted from the light entrance surface IS at the maximum light beam angle θmax is reflected (or totally reflected) on the upper end surface TP or the lower end surface BP, it is possible to prevent such image light GLa, GLb from being emitted from the light emission surface OS as the ghost light.

Further, as another viewpoint regarding the configuration of the light guide plate 20, the specific numerical value range of the pitch PT as the interval between the reflecting units constituting the image take-out section 23 is set to 0.2 mm or larger, more preferably to 0.2 mm through 0.7 mm. By setting the pitch PT to the value within this range, it is possible to prevent the image light to be taken out from being affected by the diffraction in the image take-out section 23, and prevent the cross stripes due to the reflecting units 23c from becoming conspicuous to the observer.

Hereinafter, the reason that the lower limit of the pitch PT of the reflecting units 23c is set to 0.2 mm will specifically be explained. Here, the pitch PT of the reflecting units 23c corresponds to the diffraction grating period. Therefore, in this case, the generation status of the diffraction phenomenon can be estimated using the grating equation.

$$\sin \delta_1 + \sin \delta_2 = m\lambda/PT$$

(where $\delta_1$ denotes the incident angle, $\delta_2$ denotes the output angle, m denotes the diffraction order, and $\lambda$ denotes the wavelength.)

Here, assuming that the incident angle is 0°, and the diffraction order is 1, the equation described above can be modified as follows.

$$\sin \delta_2 = \lambda/PT$$

Further, assuming that the wavelength of the light beam guided by the light guide plate 20 is 550 nm±150 nm, and the measure of the pitch PT is millimeter, the output angle $\delta_2$, namely the diffraction angle, is obtained as follows.

$$\sin \delta_2 = 550 \pm 150 \times 10^{-6}/PT$$

In other words, the wavelength dispersion angle $\Delta\delta$ due to the image take-out section 23 can be obtained as follows.

$$\Delta\delta = \sin^{-1}(700 \times 10^{-6}/PT) - \sin^{-1}(550 \times 10^{-6}/PT) \quad (3)$$

Incidentally, denoting the horizontal field angle of the image light by $\omega$, and the number of horizontal pixels by n, the field angle $\phi$ between the pixels can approximately be expressed as follows.

$$\phi = \omega/n$$

Therefore, it is required that the pitch PT is set so that the field angle $\phi$ between the pixels becomes smaller than the wavelength dispersion angle $\Delta\delta$, and as a result, the following relationship needs to be fulfilled.

$$\phi > \Delta\delta$$

$$\omega/n > \sin^{-1}(0.7 \times 10^{-3}/PT) - \sin^{-1}(0.55 \times 10^{-3}/PT) \quad (4)$$

Figure 4:
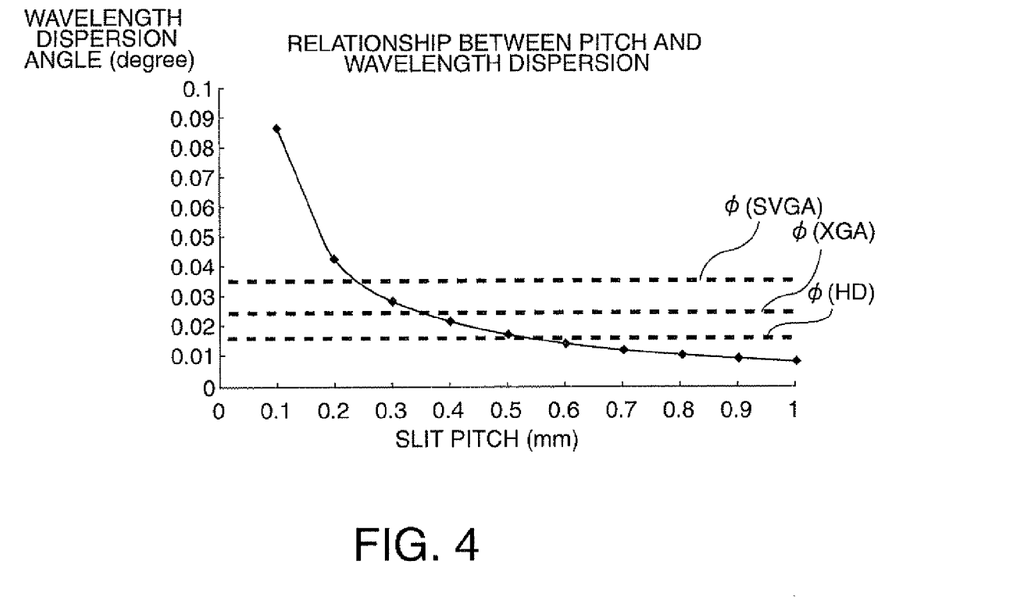
FIG. 4 is a graph showing a relationship between a pitch of reflecting units and wavelength dispersion of the image light.

The setting of the pitch PT will specifically be explained with reference to FIG. 4. In the graph shown in the drawing, the horizontal axis represents the value of the pitch PT (a slit pitch), and the vertical axis represents the value of the wavelength dispersion angle $\Delta\delta$ of the image light. As is obvious from the graph, although the wavelength dispersion angle $\Delta\delta$ decreases as the pitch PT increases, the gradient of the decrease gradually becomes gentle. If the image light is the SVGA type, for example, the approximated field angle $\phi = \omega/n$ between the pixels is 0.036°, and the wavelength dispersion angle $\Delta\delta$ needs to be set smaller than 0.036°. Therefore, in the practical light guide plate 20, by setting the pitch PT of the reflecting units 23c in the image take-out section 23 to be 0.2 mm or larger, the degradation of resolution due to the diffraction can be prevented. it should be noted that if the image light is the XGA type or the HD type as shown in the drawing, since the field angle $\phi$ between the pixels becomes smaller than in the case of the SVGA type, it is required to set the pitch PT to 0.4 mm or larger, or 0.5 mm or larger. Incidentally, the upper limit of the pitch PT is set to approximately 0.7 mm or smaller as described. Thus, the cross stripes due to the reflecting units 23c arranged in a striped manner becomes inconspicuous to the observer.

Figure 5:
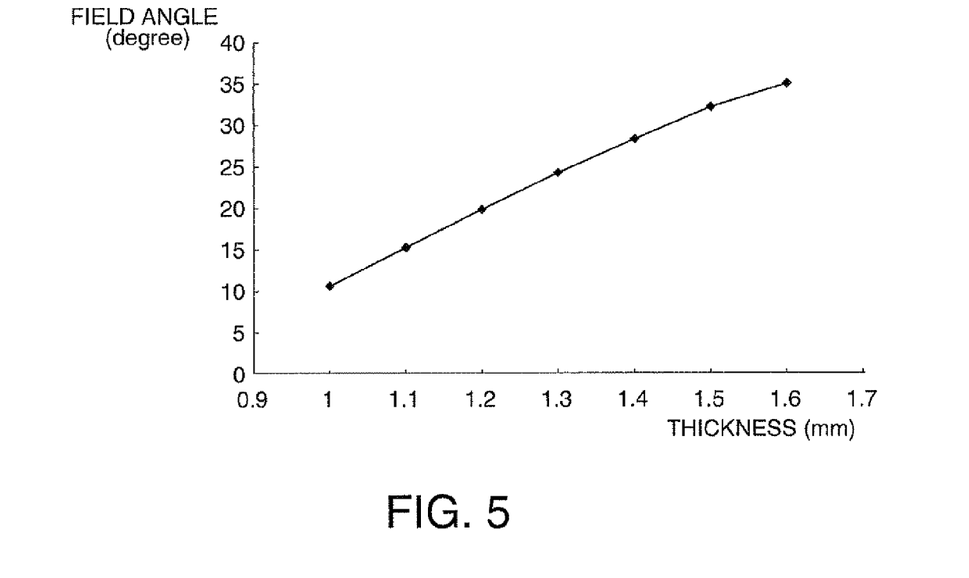
FIG. 5 is a graph showing a relationship between a refractive index of a light guide section and a field angle.

Further, as another viewpoint regarding the configuration of the light guide plate 20, the thickness t of the light guide plate 20, namely the distance from the first total reflection surface 22a to the second total reflection surface 22b, is preferably no smaller than 1.5 mm, and desirably no smaller than 1.5 mm and no larger than 5 mm. FIG. 5 is a graph showing a relationship between the thickness t of the light guide plate 20 assuming that the refractive index n of the transparent resin used for the light guide plate 20 is n=1.5 and the field angle $\omega$, which can be achieved with such a configuration, wherein the horizontal axis represents the thickness t and the vertical axis represents the field angle $\omega$ of the virtual image light. In this case, by setting the thickness t to 1.5 mm or larger, the sufficient field angle can be taken with respect to the image light, namely the virtual image light, and for example, the virtual image light corresponding to the condition of projecting the picture equal to or larger than 40 inches can be output 2 m ahead. It should be noted that by setting the thickness t of the light guide plate 20 to 5 mm or smaller, the light guide plate 20 can be made relatively light in weight.

Figure 6A:
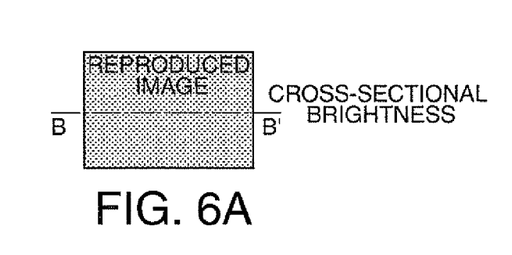
FIGS. 6A through 6F are a diagram showing a check position of a brightness condition of a reproduced image, and graphs showing a relationship between the brightness condition at that position and the angle between first and second reflecting sections.
Figure 6B:
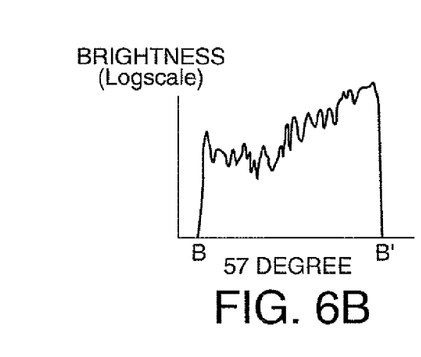
Figure 6C:
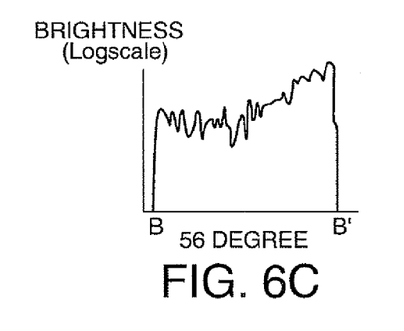
Figure 6D:
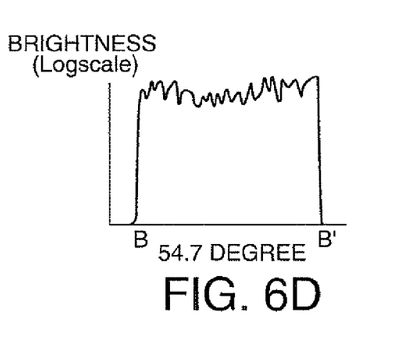
Figure 6E:
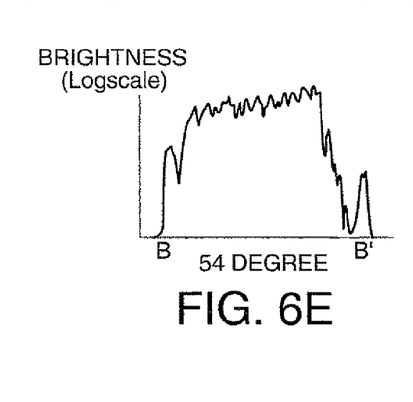
Figure 6F:
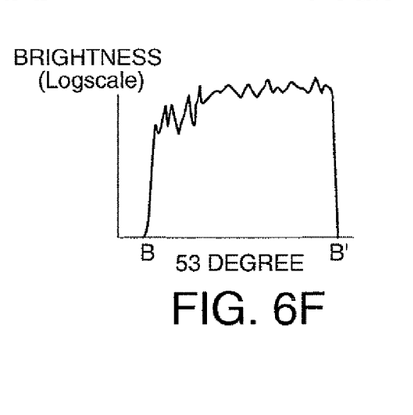

As already described, the predetermined angle (the relative angle) $\alpha$ between the first and second reflecting surfaces 23a, 23b of the reflecting unit 23c shown in FIG. 2A and so on is set to $\alpha=54.7°$ in the specific example. FIGS. 6A through 6F show the relationship between the relative angle between the first and second reflecting surfaces 23a, 23b, and the brightness distribution of the image light. Here, FIGS. 6B through 6F are graphs showing the conditions of the brightness when arbitrarily changing the value of the relative angle $\alpha$ in a range of 53° through 57° with respect to the B-B' cross section (the brightness cross section) in the reproduced image shown in FIG. 6A. As is understood from FIGS. 6B through 6F, the optimum condition in which the brightness variation in the B-B' cross section in FIG. 6A is the smallest is obtained when the value of the relative angle $\alpha$ becomes $\alpha=54.7°$ as shown in FIG. 6D, and further, it is understood from another drawing such as FIG. 6B that the closer to $\alpha=54.7°$ the value of the relative angle is, the smaller the brightness variation is. Further, the angle coincides with the angle obtained by anisotropic etching of single-crystal silicon to be the mold for forming the reflecting units 23c. Therefore, the transferring mold and so on can be formed with relative ease in a condition with high accuracy, and further, the surfaces in a highly flat condition can be formed as the first and second reflecting surfaces 23a, 23b.

As described above, the image light entering the image take-out section 23 in the light guide plate 20 according to the present embodiment is reflected by the first reflecting surface 23a and the second reflecting surface 23b in a two-stage manner. In this case, it is not only possible to make the light beam with a small total reflection angle out of the image light directly enter the entrance side near to the light entrance surface IS as the light entrance section out of each of the reflecting units 23c, but also to make the light beam with a large total reflection angle directly enter the back side far from the light entrance surface IS out of each of the reflecting units 23c to thereby make it possible to take out the image light to the outside. According to this configuration, it is possible to limit the number of times of reflection of the image light on each of the first and second reflecting surfaces 23a, 23b to once. In other words, the image light passes through the image take-out section 23 only once to thereby be deflected in the light path, and is then emitted from the light emission surface OS. Therefore, since the image light is not required to pass through the image take-out section 23 two or more times, the image light is emitted as the effective virtual image light for the observer while keeping the condition in which the brightness variation and the picture variation are prevented and a high light efficiency can be obtained.

E. Second Embodiment

A second embodiment obtained by modifying the first embodiment will hereinafter be explained with reference to FIGS. 7A and 7B. It should be noted that in the second embodiment shown in FIGS. 7A and 7B, the constituents denoted with the same reference symbols as in the light guide plate 20 shown in FIG. 1B and so on are equivalent to those explained in the first embodiment, unless particularly explained.

Figure 7A:
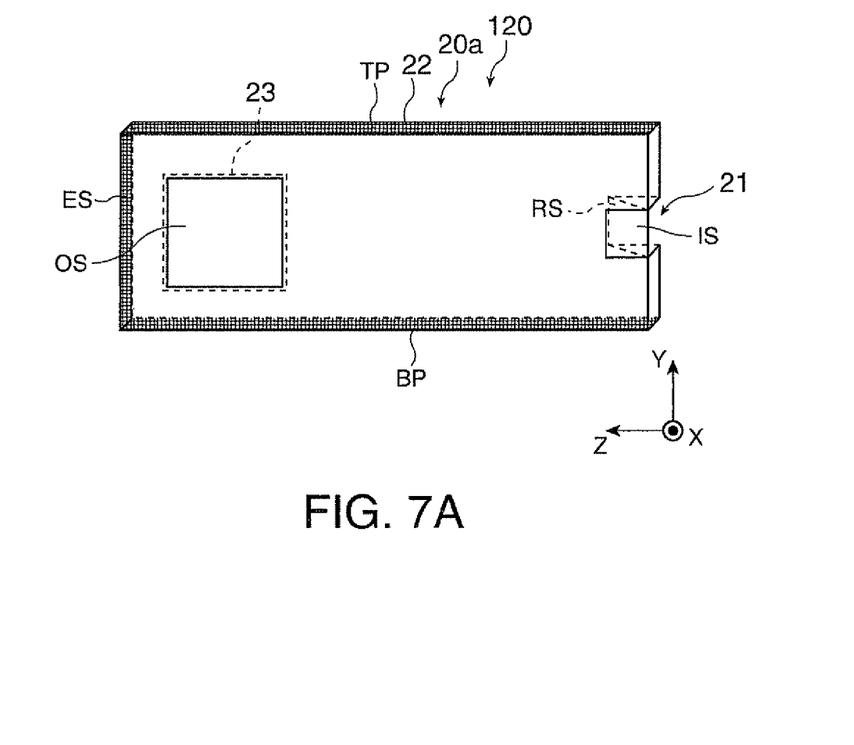
FIGS. 7A and 7B are diagrams respectively showing modified examples of the light guide plate.
Figure 7B:
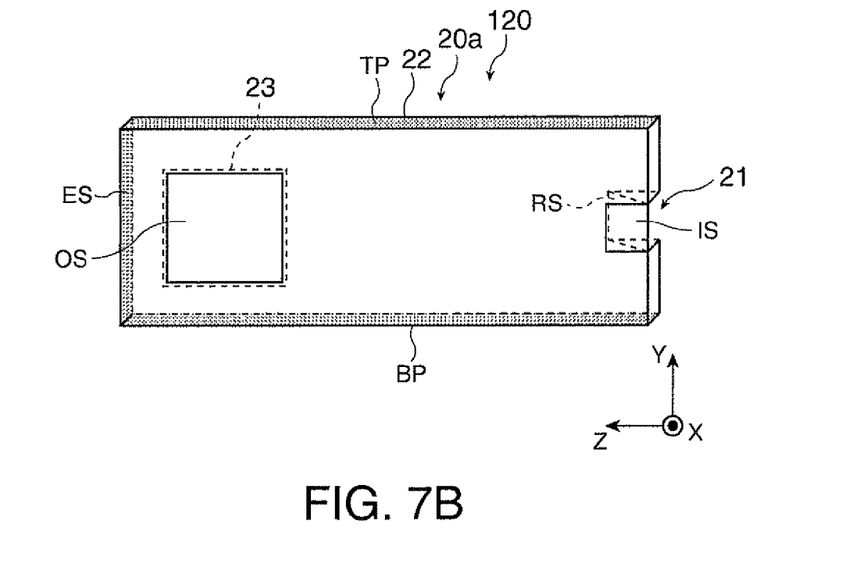

The light guide plate 120 according to the second embodiment shown in FIG. 7A is provided with black paint applied on the upper end surface TP, the lower end surface BP, and the termination surface ES. In other words, the upper end surface TP, the lower end surface BP, and the termination surface ES are the surfaces coated with the black paint, and block the component of the outside light, which can enter the image light to cause a ghost image, for example. Further, in the light guide plate 220 shown in FIG. 7B, the upper end surface TP, the lower end surface BP, and the termination surface ES are formed as sandblasted surfaces, and also block the outside light described above.

As described above, according to the second embodiment, since the upper end surface TP, the lower end surface BP, and the termination surface ES as a part of the outer peripheral section for defining the outer shape of the light guide section 22 are provided with a light blocking property against the outside light, it can be prevented that a part of the outside light enters the light guide section 22, and then emitted from the light emission surface OS as a ghost light.

Other Issues

Although the invention is hereinabove explained along the embodiments, the invention is not limited to the embodiments described above, but can be put into practice in various forms within the scope or the spirit of the invention, and the following modifications, for example, are also possible.

Firstly, the pitch PT of the arrangement of the reflecting units 23*c* constituting the image take-out section 23 is not limited to the case in which the pitch is constant throughout the first reflecting surface 23*a*, but includes the case in which the pitch PT has a certain variation.

Further, although in the explanation described above the transmissive liquid crystal device 11 is used as the image display element, the image display element is not limited to the transmissive liquid crystal device, but various devices can be used therefor. For example, the configuration using the reflective liquid crystal panel is also possible, and it is also possible to use the digital micromirror device and so on instead of the liquid crystal device 11. Further, the configuration using the light-emitting element represented by an organic EL, an LED array or an OLED is also possible. Further, the configuration using the laser scanner obtained by combining a laser source and a scanner such as a polygon mirror is also possible.

Although in the explanation described above the virtual image display device 100 has the configuration of providing the set of the image forming device 10 and the light guide plate 20 corresponding to each of the right and left eyes, it is also possible to adopt the configuration of providing the image forming device 10 and the light guide plate 20 corresponding to either one of the right and left eyes to thereby view the image with a single eye.

Although in the explanation described above the see-through type of virtual image display device is explained, the image take-out section 23 can also be applied to other virtual image display device than the see-through type. It should be noted that if it is not necessary to make the observer observe the external image, it is possible to set the light reflectance of both of the first and second reflecting surfaces 23*a*, 23*b* to approximately 100%.

Although in the explanation described above, the light entrance surface IS and the light emission surface OS are disposed on the same plane, the configuration is not limited thereto, but the configuration of disposing the light entrance surface IS on the same surface as the first total reflection surface 22*a*, and the light emission surface OS on the same surface as the second total reflection surface 22*b*, for example, can also be adopted.

Although in the explanation described above the mirror layer 21*a* constituting the incident light deflection section 21 and the tilt angle of the tilted surface RS are not particularly mentioned, the invention is not limited to those of tilting the mirror layer 21*a* and so on, for example, 45° with respect to the optical axis OA to thereby deflect the image light in the orthogonal direction. In other words, the tilt angle of the mirror layer 21*a* can be set to various values in accordance with the specification such as the purpose.

Although in the explanation described above the upper end surface TP, the lower end surface BP, and so on out of the peripheral section defining the outer shape in the light guide section 22 are formed as the surfaces coated with the black paint or the sandblasted surfaces, the invention is not limited thereto, but the black paint or the sandblast process can be performed on other places than the upper end surface TP or the lower end surface BP. Further, by contraries, it is also possible to perform the black paint or the sandblast process only for a part of the upper end surface TP, the lower end surface BP, and so on.

Although in the explanation described above the specific explanation is made assuming that the virtual image display device 100 of the embodiments is the head-mount display, it is also possible to modify the virtual image display device 100 according to the embodiment into a head-up display.

Although in the explanation described above it is assumed that in the first and second total reflection surfaces 22*a*, 22*b*, the image light is totally reflected on the interface with air to thereby guide the image light without providing a mirror or a half mirror on the surface, the total reflection in the invention should include the reflection performed by the mirror coat or the half mirror film formed on the entire or a part of each of the first and second total reflection surfaces 22*a*, 22*b*. For example, there is included the case in which the mirror coat or the like is applied to the entire or a part of each of the total reflection surfaces 22*a*, 22*b* with the incident angle of the image light fulfilling the total reflection condition, thereby reflecting the substantially whole image light. Further, it is also possible to coat the entire or a part of each of the total reflection surfaces 22*a*, 22*b* with a mirror with some transmissive property providing the image light with sufficient brightness can be obtained.

The entire disclosure of Japanese Patent Application No. 2010-137996, filed Jun. 17, 2010 is expressly incorporated by reference herein.

What is claimed is:

1. A light guide plate comprising:
    a light entrance section adapted to take in an image light inside;
    a light guide section having first and second total reflection surfaces extending so as to be opposed to each other, and adapted to guide the image light taken in from the light entrance section by total reflection on the first and second total reflection surfaces;
    an image take-out section having a plurality of reflecting units each having a first reflecting surface and a second reflecting surface having a predetermined angle with the first reflecting surface, and arranged in a predetermined direction, and adapted to make it possible to take out the image light to an outside by deflection of a light path performed by the first reflecting surface reflecting the image light entering via the light guide section and the second reflecting surface further reflecting the image light reflected by the first reflecting surface; and a light emission section adapted to emit the image light, which passes through the image take-out section, to the outside, wherein the first and second reflecting surfaces extend in a direction parallel to the first total reflection surface, and are tilted at respective angles different from each other with the first total reflection surface around respective axes in longitudinal directions extending perpendicularly to the predetermined direction in which the plurality of reflecting units is arranged, the first reflecting surface has a tilt angle from 80° to 100° with the first total reflection surface of the light guide section, and the second reflecting surface has a tilt angle from 30° to 40° with the first total reflection surface of the light guide section.

2. The light guide plate according to claim 1 wherein in each of the reflecting units, the first reflecting surface and the second reflecting surface are disposed adjacent to each other.

3. The light guide plate according to claim 1 wherein the plurality of first reflecting surfaces constituting the plurality of reflecting units is arranged with predetermined intervals in parallel to each other.

4. The light guide plate according to claim 1 wherein the image light entering each of the reflecting units passes through the image take-out section once to be deflected in a light path, thereby being emitted from the light emission section as a virtual image light.

5. The light guide plate according to claim 1 wherein the image take-out section formed along a plane including the first total reflection surface of the light guide section, and the light emission section is disposed on a plane including the second total reflection surface of the light guide section.

6. The light guide plate according to claim 5 wherein a distance from the first total reflection surface to the second total reflection surface is one of equal to or larger than 1.5 mm.

7. The light guide plate according to claim 1 wherein a light reflectance of the first reflecting surface is higher than a light reflectance of the second reflecting surface.

8. The light guide plate according to claim 6 wherein a light reflectance of the second reflecting surface is one of equal to or higher than 50%.

9. The light guide plate according to claim 1 wherein the plurality of reflecting units is arranged at a pitch one of equal to or larger than 0.2 mm.

10. The light guide plate according to claim 1 wherein at least an outer peripheral section adapted to define an outer shape in the light guide section includes either of a surface coated with a black paint and a sandblasted surface.

11. The light guide plate according to claim 1 wherein the first and second reflecting surfaces extend in a direction parallel to the first total reflection surface, and have a direction, which extends perpendicularly to the predetermined direction in which the plurality of reflecting units is arranged, as a longitudinal direction, and a width of the light guide section with respect to the longitudinal direction is one of equal to and larger than 20 mm.

12. The light guide plate according to claim 1 wherein the light guide section is made of a refractive index material with a refractive index one of equal to or larger than 1.5.

13. A virtual image display device comprising:
the light guide plate according to claim 1; and
an image forming device adapted to form the image light to be guided by the light guide plate.

14. A virtual image display device comprising:
the light guide plate according to claim 2; and
an image forming device adapted to form the image light to be guided by the light guide plate.

15. A virtual image display device comprising:
the light guide plate according to claim 3; and
an image forming device adapted to form the image light to be guided by the light guide plate.

16. A virtual image display device comprising:
the light guide plate according to claim 4; and
an image forming device adapted to form the image light to be guided by the light guide plate.

17. A virtual image display device comprising:
the light guide plate according to claim 5; and
an image forming device adapted to form the image light to be guided by the light guide plate.

18. A virtual image display device comprising:
the light guide plate according to claim 6; and
an image forming device adapted to form the image light to be guided by the light guide plate.

19. The light guide plate according to claim 1, wherein the first reflecting surface is perpendicular or nearly perpendicular to the first total reflection surface.

20. The light guide plate according to claim 1, wherein the first reflection surface of each of the plurality of reflecting units reflects the entirety of the image light guided by the light guide section.

* * * * *